United States Patent [19]

Ishida

[11] 3,781,649
[45] Dec. 25, 1973

[54] HIGH VOLTAGE PULSE GENERATING APPARATUS

[75] Inventor: Yoshio Ishida, Osaka, Japan
[73] Assignee: Diamond Electric Manufacturing Co. Ltd., Osaka, Japan
[22] Filed: July 31, 1972
[21] Appl. No.: 276,606

[52] U.S. Cl................ 323/19, 315/239, 315/240, 323/22 SC, 323/24, 323/34
[51] Int. Cl. ............................................. G05f 3/04
[58] Field of Search..................... 307/252 B, 252 T, 307/273; 315/239, 240, 282; 323/19, 22 SC, 24, 34, 38, 62; 328/13, 28, 59, 66, 67, 68

[56] References Cited
UNITED STATES PATENTS

| | | | |
|---|---|---|---|
| 3,414,768 | 12/1968 | Peek ................................... | 315/240 |
| 3,479,560 | 11/1969 | Paget et al. ..................... | 323/24 UX |
| 3,544,839 | 12/1970 | Fähnrich......................... | 315/240 X |
| 3,386,498 | 6/1968 | Funfstuck ....................... | 307/273 X |
| 3,235,769 | 2/1966 | Wattenbach.................... | 315/240 X |
| 3,443,185 | 5/1969 | Sowa.............................. | 307/252 T |
| 3,699,385 | 10/1972 | Paget ................................. | 315/239 |

Primary Examiner—A. D. Pellinen
Attorney—Richard C. Sughrue et al.

[57] ABSTRACT

A low level control voltage is produced by a first transformer connected to an alternating current power supply of commercial frequency through a rectifying device. A second transformer is connected through a capacitor and a bidirectional thyristor to the alternating current power supply. The high voltage pulse output of the second transformer is applied to the load such as fuel ignition spark gap, etc. When the control voltage from the first transformer periodically exceeds a predetermined voltage, a monostable-multivibrator is triggered, generating a pulse of a predetermined width. The pulse is applied to the base of a transistor having its collector connected to the gate of a bidirectional thyristor. Therefore, the bidirectional thyristor is turned on at a predetermined phase in every half cycle of the commercial frequency. A desired high voltage pulse is obtained at the secondary of the second transformer by the cooperative effects of a charging capacitor and the high voltage generated by series resonance of the charging capacitor and the primary winding of the transformer.

1 Claim, 3 Drawing Figures

PATENTED DEC 25 1973 3,781,649

HIGH VOLTAGE PULSE GENERATING APPARATUS

BACKGROUND OF THE INVENTION

1. Field of the Invention

This invention relates to a high voltage pulse generating device.

2. Description of the Prior Art

There exist particular problems in a high voltage generating device used for ignition of fuels such as fuel gas and sprayed fuel or for lighting neon advertising lamps. One problem is the need for a relatively high voltage such as 10KV or above for producing an arc for starting ignition and the need for a relatively low voltage after the arc has been established.

A high-leakage transformer has been used heretofore as means for overcoming the problem. However, transformers of this type are not made compact, and they need relatively large switches for directly opening and closing the input circuit for the output control.

SUMMARY OF THE INVENTION

It is an object of the present invention to provide a high voltage pulse generating device which is compact, lightweight and low in electric power consumption required for the output control, for supplying high voltage to a discharge type of load. For example, the device may be used for fluid fuel ignition or lighting a neon lamp.

Two transformers are provided in the high voltage pulse generating device of this invention. The output of the first transformer is a low level control voltage applied from an a.c. source through a full wave rectifying circuit. A capacitor and a bidirectional thyristor are connected in series with the input of the second transformer. The gate electrode of the bidirectional thyristor is connected through the collector-emitter-path of a transistor to the output of the rectifying circuit. The base electrode of the transistor is connected to the output of a monostable-multivibrator. The monostable-multivibrator is triggered every time the output voltage of the rectifying circuit exceeds a predetermined value which occurs at a predetermined phase angle of the waveform of the power supply. A pulse of a predetermined width is thus applied to the base electrode of the transistor to turn the transistor ON. Thus, the thyristor turns ON at said predetermined phase angle. The voltage generated by the charge on the capacitor is added to a high voltage generated by properly selecting the values of the capacitance of the capacitor and inductance and resistance of the primary winding of the second transformer in serial relation with said capacitor, so that the high voltage pulse, at the secondary of the second transformer, greatly exceeds the voltage due only to the turns-ratio between the primary and secondary windings of the transformer.

DESCRIPTION OF THE PREFERRED EMBODIMENT

Figure 1:
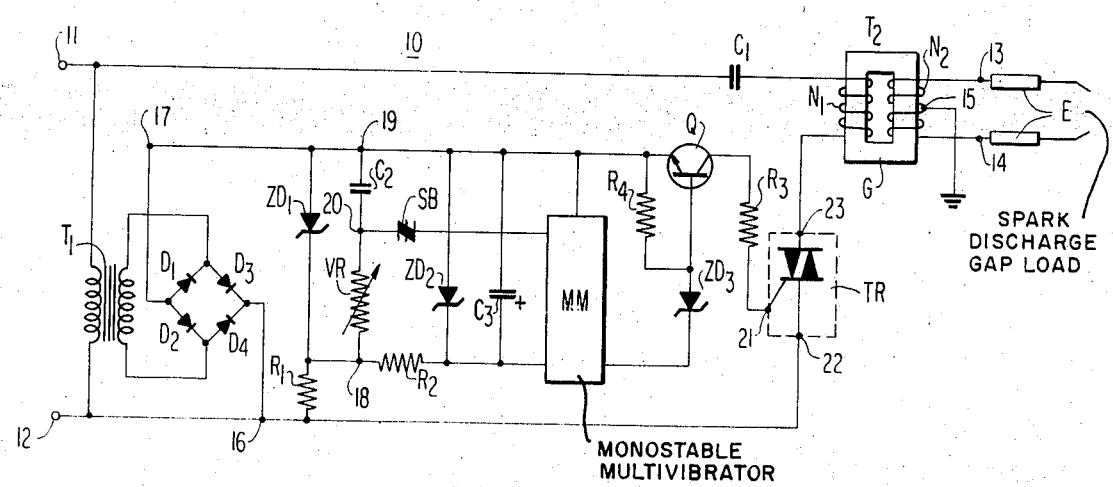
FIG. 1 is an electric circuit diagram showing a high voltage pulse generating device according to the present invention.

In FIG. 1, the high voltage pulse generating device 10 comprises input terminals 11 and 12, output terminals 13 and 14, and neutral grounding terminal 15. The input terminals 11 and 12 are connected to an alternating current power supply (not shown). The output terminals 13 and 14 are connected to a load such as fuel ignition spark discharge gap E. The primary winding of a first transformer $T_1$ is connected between the input terminals 11 and 12. The secondary windings of the transformer $T_1$ is connected to the input terminals of a full wave rectifying circuit composed of diodes $D_1$, $D_2$, $D_3$ and $D_4$. The positive output terminal 16 of the rectifying circuit is connected to an input terminal 12 of the device. A resistor $R_1$ and a zener-diode $ZD_1$ connected in series are connected between the positive output terminal 16 of the rectifying circuit and the negative output terminal 17. A capacitor $C_2$ and a variable resistor VR connected in series are connected in parallel with the diode $ZD_1$. Further, second zener-diode $ZD_2$ and a resistor $R_2$ connected in series are connected in parallel with the diode $ZD_1$. A capacitor $C_3$ is connected in parallel with the second zener-diode $ZD_2$. A monostable-multivibrator MM is connected in parallel with the capacitor $C_3$. The trigger input terminal of the monostable-multivibrator MM is connected through semiconductor constant-voltage switching device SB to the connecting point 20 of the capacitor $C_2$ and the variable resistor VR.

The second transformer $T_2$ has primary winding $N_1$ having a number of turns $N_1$, secondary winding $N_2$ having a number of turns $N_2$, and closed iron core G on which the windings $N_1$ and $N_2$ are provided. One side of the primary winding $N_1$ is connected to the input terminal 11 of the device through the capacitor $C_1$. One terminal 23 of the main-path of the bidirectional thyristor TR is connected to the other side of the primary winding $N_1$ of the transformer $T_2$, while the other terminal 22 of the main-path thereof is connected to the input terminal 12 of the device. Both the sides of the secondary winding $N_2$ of the transformer $T_2$ are connected to the load E through the output terminals 13 and 14 of the device as previously described. The neutral point of the secondary winding $N_2$ is connected to ground through the terminal 15. The gate electrode of the bidirectional thyristor TR is connected to the collector of the transistor Q through the connecting point 21 and the resistor $R_3$, and the emitter of the transistor Q is connected to the negative output terminal 17 of the rectifying circuit. The base of the transistor Q is connected to the output terminal of the monostable-multivibrator MM through the third zener diode $ZD_3$. A bias resistor $R_4$ is connected across the emitter-base of the transistor Q.

Figure 2:
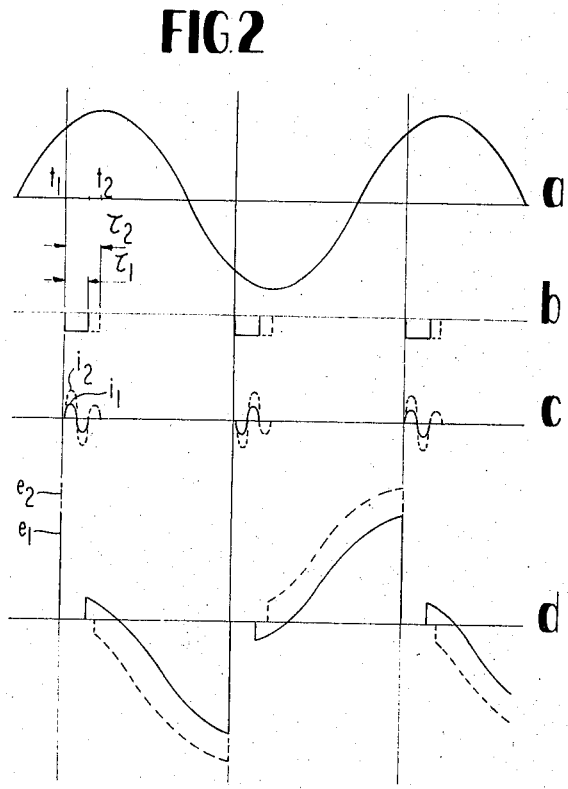
FIG. 2 is waveforms for the explanatory purpose of the operation of the circuit shown in FIG. 1.

The operation of the high voltage pulse generating device thus constructed will now be described in the following:

When a line voltage as shown in FIG. 2a, such as 100V at 60 cycles is applied to the input terminals 11 and 12, a low voltage such as 24V of the same frequency is generated at the output terminals of the transformer $T_1$. This low voltage alternating current is applied through full wave rectifying circuit composed of the diodes $D_1$, $D_2$, $D_3$ and $D_4$ to produce a pulsating voltage having peak values at every half cycle between the output terminals 16 and 17. This pulsating voltage is applied to both terminals 18 and 19 of the series connection of the variable resistor VR and the capacitor $C_2$ through the resistor $R_1$. The maximum voltage between the points 18 and 19 are clipped by the zener diode $ZD_1$ to become for example 14 volts. The voltage at the terminal 20 of the capacitor $C_2$ and the variable resistor VR thus increases. A trigger pulse is applied to the trigger input terminal of the monostable-multivibrator MM from the switching device SB at the time point $t_1$ at the phase angle of the waveform of the power supply determined by the capacitance of the capacitor $C_2$, set value of the variable resistor VR and the break-over voltage of the switching device SB such as in FIG 2a.

The output of the rectifying circuit is applied to the input terminal of the monostable-multivibrator MM through the resistor $R_2$. The input voltage of the monostable-multivibrator MM is determined by the zener voltage (for example, 9 volts) of the zener-diode $ZD_2$, and is smoothed sufficiently by the capacitor $C_3$. When the trigger pulse is applied to the monostable-multivibrator MM as previously described, the monostable-multivibrator MM generates the pulse having a predetermined width such as $\tau_1$ in FIG. 2b at the output terminal thereof. The width of the pulse $\tau_1$ is determined by the elements of the monostable-multivibrator and the time constant is varied by properly selecting these values, so that the time $\tau_2$ is adjustable as shown.

When the output pulse voltage of the multivibrator MM exceeds the zener voltage of the zener-diode $ZD_3$, it is applied to the base of the transistor Q, thereby turning ON the transistor Q. When the transistor Q is made conductive, the current of waveform shown in FIG. 2b, determined substantially by the value of the resistor $R_3$, flows through the gate of the thyristor TR. Thus, the thyristor TR becomes conductive. An oscillating current $i_1$ in FIG. 2c detrmined by the capacitance of the capacitor $C_1$, inductance of the transformer $T_2$ and the internal resistance thereof, flows through the thyristor TR. Before the third pulse of current $i_1$ occurs, if the thyristor control current having width of pulse $\tau_1$ has returned to zero, the capacitor $C_1$ is charged and held so that the polarity of the capacitor $C_1$, at the terminal connected to the input terminal 12, is positive. Thus, the voltage across the thyristor TR is shown by a curve $e_1$ in FIG. 2d. As the width of the control current pulse is set to $\tau_2$ by adjusting the time constant of the monostable-multivibrator MM, the current flowing through the thyristor TR, therefore, the current flowing through the transformer $T_2$ and the capacitor $C_1$, may contain the third pulse shown by $i_2$ in FIG. 2c. In this case, the capacitor $C_1$ is charged and is held so that the polarity of the input terminal 11 of the capacitor $C_1$ is positive. The voltage across the thyristor TR is then shown by the curve $e_2$ in FIG. 2d.

It has been found that the voltage applied to both terminals of the thyristor TR is raised up to three times the line voltage by properly selecting the widths $\tau_1$ or $\tau_2$ of the output pulse of the monostable-multivibrator MM, the phase angle at which the thyristor TR is triggered, the capacitance of the capacitor $C_1$, and the inductance and internal resistance of the transformer $T_2$. It will be understood that voltage $e_1$ or $e_2$ across the thyristor TR is applied to the primary winding of the transformer $T_2$, and a high voltage is derived from the output terminals 13 and 14 connected to the secondary winding. It is clear that the output voltage is much higher than the value of the product of the winding turns ratio $N_2/N_1$ of the transformer $T_2$ times the line voltage.

As described heretofore in detail, it will be understood that a voltage much higher than the value of the winding turns ratio $N_2/N_1$ of the transformer $T_2$ times the voltage of alternating current applied to the input terminals is provided using the high voltage pulse generating device of this invention.

In other words, number of turns $N_1$ of the primary winding may be increased to lower the $N_2/N_1$ ratio, thereby the inductance of the primary winding being increased, so that peak value of the input current, shown by $i$ in FIG. 2c, to the device may be lowered with respect to the same output voltage conditions.

Or, since number of turns $N_2$ of the secondary winding may be reduced, and both the size and the weight of the transformer may be reduced, this invention may provide a compact, lightweight high voltage pulse generating device.

Figure 3:
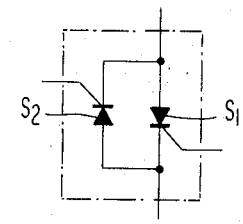
FIG. 3 shows an alternative construction of the embodiment for the thyristor TR shown in FIG. 1.

Though the description relating to FIG. 1 is conducted for an apparatus wherein the bidirectional thyristor TR is utilized, the thyristor TR may be replaced by two unidirectional thyristors $S_1$ and $S_2$ connected as shown in FIG. 3. In this case, it is necessary to provide double control circuits, but since the gate response is relatively stable, further fine control may be possible.

While the invention has been particularly shown and described with reference to the preferred embodiment thereof, it will be understood by those skilled in the art that various changes in form and details may be made therein without departing from the spirit and scope of the invention.

I claim:

1. A high voltage pulse generating device for producing high voltage pulses for generating arcs in discharge type loads said device comprising:

a. input terminals connected to an a.c. source;

b. output terminals connected to said load;

c. first capacitor means connected to one of said input terminals;

d. first transformer means having its primary connected to said first capacitor means and having its secondary connected to said load;

e. first switch means, having a gate electrode and main electrodes, connected between said primary and one of said input terminals wherein said capacitor means, said primary and said first switch means form a series circuit;

f. control means, connected to said gate electrode of said first switch means, for periodically turning ON said first switch means and thereby providing a discharge path for said first capacitor means through said series circuit, whereby the current through said primary causes a pulse to be produced in said secondary said pulse being of a very high voltage relative to the input voltage; said control means comprising:

g. low voltage pulse generating means coupled to said input terminals; and h. second switch means connected between the said low voltage pulse generating means and the gate electrode of said first switch means wherein a pulse from said low voltage pulse generating means turns ON said second switch means thereby energizing the gate electrode of said first switch means thus turning ON said first switch means; said low voltage pulse generating means comprising:

i. second transformer means coupled to said input terminals;

j. full wave rectifier means connected to the secondary of said second transformer means for producing a full wave rectifier d.c. signal;

k. trigger means, connected to said full wave rectifier means and comprising a second capacitor means and a constant voltage switching device, for producing a trigger pulse when said rectified d.c. signal reaches a predetermined phase;

l. monostable multivibrator means, having its trigger terminal connected to said trigger means and its output connected to said second switch means, wherein said multivibrator means produces a pulse of a predetermined width for turning ON said second switch means in response to receiving a trigger pulse;

m. resistor means for applying said rectified d.c. signal to an input terminal of said monostable multivibrator means; and said second switch means comprising:

n. a transistor having its base connected to said multivibrator and having its collector connected to said gate electrode of said first switch means.

* * * * *